(12) United States Patent
Persson et al.

(10) Patent No.: US 12,441,234 B2
(45) Date of Patent: Oct. 14, 2025

(54) METHOD, CONTROL ARRANGEMENT, AND CONTROL DEVICE FOR CONTROLLING A REAR LAMP IN A VEHICLE

(71) Applicant: Scania CV AB, Södertälje (SE)

(72) Inventors: Henrik Persson, Upplands Väsby (SE); Pierre Recordon, Villeurbanne (FR)

(73) Assignee: Scania CV AB, Södertälje (SE)

( * ) Notice: Subject to any disclaimer, the term of this patent is extended or adjusted under 35 U.S.C. 154(b) by 109 days.

(21) Appl. No.: 18/568,520

(22) PCT Filed: Jul. 4, 2022

(86) PCT No.: PCT/SE2022/050674
§ 371 (c)(1),
(2) Date: Dec. 8, 2023

(87) PCT Pub. No.: WO2023/282822
PCT Pub. Date: Jan. 12, 2023

(65) Prior Publication Data
US 2024/0140302 A1    May 2, 2024

(30) Foreign Application Priority Data
Jul. 6, 2021    (SE) .................................... 2150884-1

(51) Int. Cl.
*H05B 47/185*    (2020.01)
*B60Q 1/30*    (2006.01)

(52) U.S. Cl.
CPC ............. *B60Q 1/30* (2013.01); *H05B 47/185* (2020.01)

(58) Field of Classification Search
CPC .............................. B60Q 1/30; H05B 47/185
See application file for complete search history.

(56) References Cited

U.S. PATENT DOCUMENTS

| 6,055,465 A | 4/2000 | Matsunaga |
| 2011/0068951 A1* | 3/2011 | Schwartz ............... G08G 1/087 340/906 |

(Continued)

FOREIGN PATENT DOCUMENTS

| CA | 2942926 A1 | 12/2016 |
| EP | 3190005 A1 | 7/2017 |

(Continued)

OTHER PUBLICATIONS

SCANIA CV AB, International Patent Application No. PCT/SE2022/050674, International Preliminary Report on Patentability, Dec. 14, 2023.

(Continued)

*Primary Examiner* — Henry Luong
(74) *Attorney, Agent, or Firm* — Moore & Van Allen PLLC; W. Kevin Ransom (57) ABSTRACT

The invention relates to a method, a control arrangement, and a control device for controlling a rear lamp in a vehicle. The rear lamp is operated in an emergency signal mode when it is determined that an emergency signal event has occurred and based on one or more first initiation pulses associated with the emergency signal event transmitted to the control device from the control arrangement, wherein a duration of each of the one or more first initiation pulses is shorter than a duration of an emergency feed pulse. The invention also relates to a rear lamp, a vehicle, a computer program, and a computer-readable medium.

17 Claims, 5 Drawing Sheets

(56) References Cited

U.S. PATENT DOCUMENTS

| | | |
|---|---|---|
| 2014/0266667 A1 | 9/2014 | Meyer-Wendt et al. |
| 2014/0368324 A1 | 12/2014 | Seifert |
| 2016/0144778 A1 | 5/2016 | Tucker et al. |
| 2018/0007756 A1 | 1/2018 | Hong et al. |
| 2019/0168660 A1 | 6/2019 | Na et al. |
| 2019/0306939 A1 | 10/2019 | Jooss |
| 2020/0128643 A1 | 4/2020 | Jin et al. |

FOREIGN PATENT DOCUMENTS

| | | |
|---|---|---|
| EP | 3230144 B1 | 4/2020 |
| WO | 2005051710 A1 | 6/2005 |

OTHER PUBLICATIONS

SCANIA CV AB, International Patent Application No. PCT/SE2022/050674, International Search Report, Sep. 5, 2022.
SCANIA CV AB, International Patent Application No. PCT/SE2022/050674, Written Opinion, Sep. 5, 2022.
SCANIA CV AB, Swedish Patent Application No. 2150884-1, Office Action, Feb. 24, 2022.
SCANIA CV AB, Swedish Patent Application No. 2150884-1, Office Action, Nov. 4, 2022.
SCANIA CV AB, European Patent Application No. 22838122.4, Extended European Search Report, Mar. 31, 2025.

* cited by examiner

METHOD, CONTROL ARRANGEMENT, AND CONTROL DEVICE FOR CONTROLLING A REAR LAMP IN A VEHICLE

CROSS-REFERENCE TO RELATED APPLICATIONS

This application is a National Stage Patent Application (filed under 35 § U.S.C. 371) of PCT/SE2022/050674, filed Jul. 4, 2022, of the same title, which, in turn claims priority to Swedish Patent Application No. 2150884-1 filed Jul. 6, 2021, of the same title; the contents of each of which are hereby incorporated by reference.

TECHNICAL FIELD

The invention relates to a method, a control device, and a control arrangement for controlling a rear lamp in a vehicle. The invention also relates to a computer program, a computer-readable medium a rear lamp comprising such a control device, and a vehicle comprising such a control arrangement and/or such a control device and/or such a rear lamp.

BACKGROUND

The following background description constitutes a description of the background to the invention, which does not necessarily have to constitute prior art.

The lighting system of a motor vehicle consists of lighting and signaling devices mounted on the vehicle and serving different purposes. A rear lamp, also referred to as a tail lamp, may, for example, comprise a combination of different functions allowing other drivers and pedestrians to see the vehicle's presence, position, size, direction of travel, and the driver's intentions regarding direction and speed of travel.

Thus, a rear lamp may comprise functions like stop light, reverse lamp, position lamp, direction indicator, DI, lamp, to mention a few. Such functions are often distributed on different parts of the rear lamp where each part may comprise a number of lit elements and be controlled separately. For example, a DI lamp may be used for DI signaling usually activated by a driver of the vehicle when a turn is being made or when changing lanes.

Sequential DI lamp activation mode, where multiple lit elements of a DI lamp are activated sequentially is becoming increasingly popular. Such sequential activation forms a "flowing" or "running" illumination from an inner side of the DI lamp to the outer side in a chosen direction clearly showing the direction of an intended turn of the vehicle, also in situations with limited visibility.

The DI lamp may also be used for indicating automatic emergency signals like emergency stop signal, ESS, rear-end collision stop signal, RECAS, as well as for other signaling like automatic burglar alarm signal and hazard warning signal activated by the driver via a red tringle button.

According to regulation UNECE-R48, ESS and RECAS signals must be provided with flashing lights, where all lit elements are turned on simultaneously. Hence, if the DI lamp is normally sequential, it has to be switched to a flashing mode during emergency signaling.

SUMMARY

It is an object of embodiments of the invention to alleviate or solve at least some of the drawbacks with the prior art.

Thus, it is an object to provide a solution for controlling a DI lamp on a rear lamp of a vehicle working in a sequential mode so that a flashing mode is applied during ongoing emergency signal event.

According to a first aspect of the invention, aforementioned and further objectives are achieved through a method performed by a control arrangement of a vehicle. The method comprises determining that an emergency signal event has occurred. The method further comprises transmitting one or more first initiation pulses associated with the emergency signal event and subsequent emergency feed pulses on a power feed line to a control device, wherein a duration of each first initiation pulse is shorter than a duration of an emergency feed pulse.

The control arrangement may here relate to a vehicle lamp control unit configured to transmit, over a power feed line, signalling to a control device of a rear lamp intended for controlling the rear lamp of the vehicle.

An emergency signal event may here relate to an event during which the rear lamp is to be controlled in an emergency signal mode, also referred to as a flashing mode, where all light sources in the DI lamp are turned on simultaneously.

By transmitting a sequence of pulses comprising one or more first initiation pulses associated with the emergency signal event and subsequent emergency feed pulses on a power feed line to a control device, the control device may be notified that the emergency signal mode is to be applied for subsequent emergency feed pulses. Hence, a fast and efficient activation of the rear lamp is achieved according to legal requirements, mitigating the risk of emergency signal activation delays, and eliminating the risk of sequential activation of the emergency feed signals.

By configuring the duration of each first initiation pulse as being shorter than a duration of an emergency feed pulse the rear lamp is controlled in a robust way, where disturbances on the power feed line are filtered out.

Additionally, the traffic road safety may be increased as other drivers behind the vehicle will receive a fast and clear alert when the emergency signal is activated in a flashing mode with decreased response time compared to conventional methods.

Moreover, by transmitting the one or more first initiation pulses on a power feed line to the control device, no additional control cables are needed since the existing installations for controlling the rear lamp are reused. Existing installations may also be used for rear lamp control of a trailer or other unpowered vehicle towed by the vehicle. Hence a cost-efficient method is achieved.

In an embodiment of the invention, the duration of each one of the one or more first initiation pulses is less than 80% of the duration of the emergency feed pulse.

The first initiation pulse may thus be configured such that it is recognized as the first initial sequence and distinguished from an emergency feed pulse sequence or a sequence of other feed pulses. Hereby, a reliable and robust rear lamp control method is achieved.

In an embodiment of the invention, the one or more first initiation pulses have equal duration; or at least one of the one or more first initiation pulses has a different duration.

By configuring the initiation sequence to include one or more first initiation pulses with equal or different durations, a unique sequence may be obtained for controlling the rear lamp. Such a unique sequence it may be clearly distinguished from an emergency feed pulse. Moreover, it may also be distinguished from distortions or disturbances on the power supply line such as e.g., interferences or transients.

Furthermore, since an initiation sequence may be configured in various ways, it may be used to control the DI lamp to switch between sequential and flashing mode also for feed pulses other than emergency feed pulses. For example, flashing mode may be applied for feed pulses with lower frequencies that emergency feed pulses. Hence, a robust, reliable, and versatile control of the rear lamp is achieved.

In an embodiment of the invention, the method further comprises:
  determining that the emergency signal event has terminated; and
  transmitting one or more second initiation pulses associated with a sequential signal mode and subsequent sequential feed pulses on the power feed line to the control device, wherein a duration of each one of the one or more second initiation pulses is shorter than a duration of a sequential feed pulse.

By transmitting a sequence of pulses comprising one or more second initiation pulses associated with a sequential signal mode, the control device may be notified that a sequential signal mode is to be applied for the subsequent sequential feed pulses. The DI lamp is thus controlled to switch to sequential mode when the emergency signal event has terminated before the sequential feed pulses are transmitted to the control device. Hence a fast and efficient activation of the DI lamp in sequential mode is achieved, mitigating the risk of sequential signal activation delays.

In an embodiment of the invention, the emergency signal event is an emergency stop signal event or a rear-end collision stop signal event.

Hereby, the rear lamp may be controlled in an emergency mode according to legal requirements. The traffic road safety may be increased as other drivers behind the vehicle will receive a fast and clear alert when the emergency signal is activated in a flashing mode with decreased response time compared to conventional methods.

According to a second aspect, the invention relates to a method performed by a control device configured to operate a rear lamp of a vehicle. The method comprises receiving one or more first initiation pulses and subsequent emergency feed pulses on a power feed line from a control arrangement, wherein the one or more first initiation pulses indicate to the control device how the rear lamp is to be operated, and wherein a duration of each of the one or more first initiation pulses is shorter than a duration of an emergency feed pulse. The method further comprises operating the rear lamp in an emergency signal mode when receiving the one or more first initiation pulses.

By receiving a sequence of pulses comprising one or more first initiation pulses associated with the emergency signal event and subsequent emergency feed pulses on a power feed line, the control device may be notified that the emergency signal mode is to be applied for subsequent emergency feed pulses.

Hence, a fast and efficient activation of the rear lamp is achieved according to legal requirements, mitigating the risk of emergency signal activation delays.

When receiving a first initiation pulse with a duration shorter than a duration of an emergency feed pulse, the control device may easily determine if a predetermined criteria for controlling the DI lamp in an emergency signal mode is fulfilled. Thus a robust method of controlling the rear lamp is achieved.

Additionally, the traffic road safety may be increased as other drivers behind the vehicle will receive a fast and clear alert when the emergency signal is activated in a flashing mode with decreased response time compared to conventional methods.

Moreover, since the one or more first initiation pulses are received by the control device over the existing power feed line, no extra control cables need to be installed. Existing installations may also be used for rear lamp control of a trailer or other unpowered vehicle towed by the vehicle. Hence a cost-efficient method is achieved.

In an embodiment of the invention, the duration of each one of the one or more first initiation pulses is less than 80% of the duration of the emergency feed pulse.

The first initiation pulse may thus be recognized by the control device as the first initial sequence and distinguished from an emergency feed pulse sequence or a sequence of other feed pulses. Hereby, a reliable and robust rear lamp control method is achieved.

In an embodiment of the invention, the one or more first initiation pulses have equal duration or at least one of the one; or more first initiation pulses has a different duration.

Hereby, a unique first initiation sequence may be obtained for controlling the rear lamp. Such a unique sequence it may be clearly distinguished from an emergency feed pulse. Moreover, it may also be distinguished from distortions or disturbances on the power supply line such as e.g., interferences or transients. Furthermore, since an initiation sequence may be configured in various ways, it may be used to control the DI lamp to switch between sequential and flashing mode also for feed pulses other than emergency feed pulses. For example, flashing mode may be applied for feed pulses with lower frequencies than emergency feed pulses. Hence, a robust, reliable, and versatile control of the rear lamp is achieved.

In an embodiment of the invention, the method further comprises:
  detecting a stop light activation signal for the rear lamp; and
  operating the rear lamp in the emergency signal mode when the duration of each one of the one or more first initiation pulses is shorter than the duration of the emergency feed pulse and when the stop light activation signal for the rear lamp has been detected.

The additional control of the stop light activation signal may further increase the reliability of the rear lamp control method. For example, if the received one or more pulses are created due to distortions or disturbances on the power feed line and does not correspond to a predetermined criteria for activation of emergency signal mode, but has mistakenly been interpreted as such, the emergency signal mode will not be activated.

In an embodiment of the invention, the method further comprises:
  receiving one or more second initiation pulses associated with a sequential signal mode and subsequent sequential feed pulses on the power feed line from the control arrangement, wherein a duration of each of the one or more second initiation pulses is shorter than a duration of a sequential feed pulse; and
  operating the rear lamp in the sequential signal mode when receiving the one or more second initiation pulses.

When receiving a sequence of pulses comprising one or more second initiation pulses associated with a sequential signal mode, the control device may be notified that a sequential signal mode is to be applied for the following sequential feed pulses. The DI lamp is thus controlled to switch to sequential mode when the emergency signal event has terminated before the sequential feed pulses are transmitted to the control device. Hence a fast and efficient activation of the DI lamp in sequential mode is achieved, mitigating the risk of sequential signal activation delays.

In an embodiment of the invention, the method further comprises:
operating the rear lamp to switch from the emergency signal mode to a sequential signal mode when a non-pulse time period on the power feed line is larger than a threshold value.

Hereby, the operation of the rear lamp may return to a sequential mode operation when an emergency signal event has terminated.

In an embodiment of the invention, the emergency signal mode is an emergency stop signal mode or a rear-end collision stop signal mode.

Hereby, the rear lamp may be controlled in an emergency mode according to legal requirements. The road traffic safety may be increased as other drivers behind the vehicle will receive a fast and clear alert when the emergency signal is activated in a flashing mode with decreased response time compared to conventional methods.

According to a third aspect, the invention relates to a control arrangement for controlling a vehicle. The control arrangement is configured to determine that an emergency signal event has occurred. The control arrangement is further configured to transmit one or more first initiation pulses associated with the emergency signal event and subsequent emergency feed pulses on a power feed line to a control device, wherein a duration of each first initiation pulse is shorter than a duration of an emergency feed pulse.

According to a fourth aspect, the invention relates to a control device configured to operate a rear lamp of a vehicle. The control device is configured to receive one or more first initiation pulses and subsequent emergency feed pulses on a power feed line from a control arrangement, wherein the one or more first initiation pulses indicate to the control device how the rear lamp is to be operated, wherein a duration of each of the one or more first initiation pulses is shorter than a duration of an emergency feed pulse. The control device is further configured to operate the rear lamp in an emergency signal mode when receiving the one or more first initiation pulses.

According to a fifth aspect, the invention relates to a rear lamp for a vehicle comprising a control device according to the fourth aspect.

According to a sixth aspect, the invention relates to a vehicle comprising a control arrangement according to the third aspect and/or a control device according to the fourth aspect and/or a rear lamp according to the fifth aspect.

According to a seventh aspect, the invention relates to a computer program comprising instructions which, when the program is executed by a computer, cause the computer to carry out the method according to the first aspect and the second aspect.

According to a fifth aspect, the invention relates to a computer-readable medium comprising instructions which, when executed by a computer, cause the computer to carry out the method according to the first aspect and the second aspect.

BRIEF DESCRIPTION OF THE DRAWINGS

Embodiments of the invention will be illustrated in more detail below, along with the enclosed drawings, where similar references are used for similar parts, and where.

DETAILED DESCRIPTION

DI lamps, or turn indicator lamps, are mounted near the left and right front and rear corners of a vehicle, and sometimes on the sides or on the side mirrors of a vehicle. DI lamps are used to indicate DI signals and are usually activated on one side of the vehicle at a time to advertise an intent to turn or change lanes towards that side. DI lamps integrated in the vehicle's rear lamp may also be used for other purposes, for example when an automatic emergency signal is activated.

Example of emergency signal is ESS and RECAS. ESS is a lighting function activated under heavy/urgent braking or when it is detected that a collision is about to occur. RECAS is an automatic signal given by a leading vehicle to warn a following vehicle that an emergency action is needed to avoid a collision.

DI signals are usually activated by a driver of the vehicle when a turn is being made which triggers power supply pulses, or feed pulses, being transmitted over a power supply line to activate the DI lamp. The feed pulses are received by a control device which activates the DI lamp during a feed pulse and deactivates it during a non-pulse period.

Figure 1:
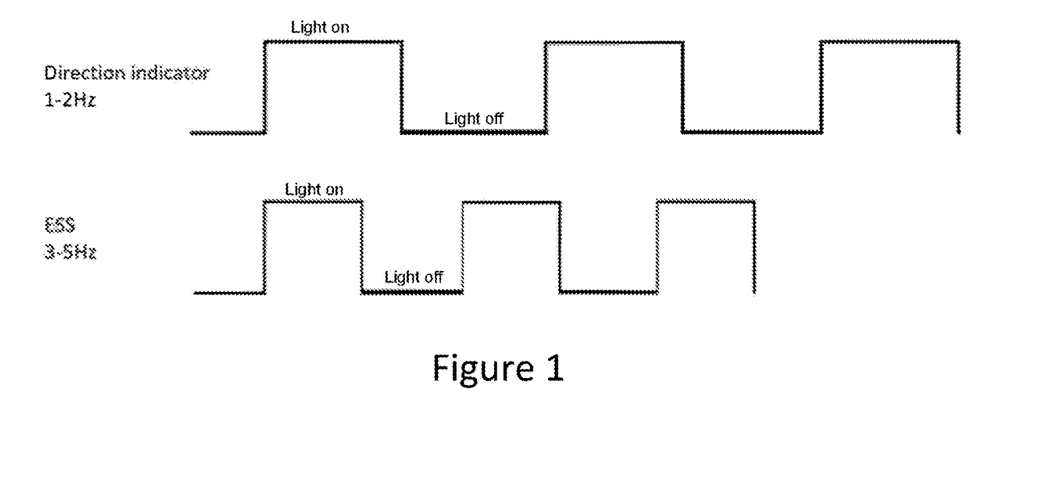
FIG. 1 illustrates feed pulses for activating a DI lamp in a vehicle.

FIG. 1 schematically illustrates feed pulses for activating the DI lamp for DI signalling and ESS/RECAS signalling, respectively. As can be seen in FIG. 1, each feed pulse sequence comprises a number of pulses indicating activation of the DI lamp and non-pulse time periods when the DI lamp is to be inactive. Normally the feed pulses and the non-pulse time periods have equal duration. According to international regulations DI signals are required to blink or flash on and off at a rate of between 60 and 120 blinks per minute (1-2 Hz) as illustrated in FIG. 1. This means that the duration of one DI feed pulse may be between 500 ms and 250 ms.

DI signals may be activated in a sequential mode which, according to UNECE-R6 is referred to as sequential direction indicator. In sequential mode, multiple lit elements in the DI lamp are illuminated sequentially; e.g. the innermost light source lights and remains illuminated, the next outmost light source lights and remains illuminated, followed by the next outermost light source and so on until the outermost light source lights briefly, at which point all light sources extinguish together and, after a short pause, the cycle begins again. The visual effect is one of outward motion, flowing or running in the direction of the intended turn or lane change.

As shown in FIG. 1, ESS/RECAS signals are required to flash in phase at 3 to 5 Hz, i.e., 180-300 blinks per minute. ESS/RECAS signals must according to regulations be activated in a flashing mode, where all lit elements in the DI lamp are turned on simultaneously. Thus, as previously explained a DI lamp operating in a sequential mode must be switched to a flashing mode during emergency signaling. The duration of one emergency feed pulse may be between ~167 ms and 100 ms.

In conventional solutions, switching between sequential and flashing mode has been done based on frequency of the feed signals. For example, when a pulse with a frequency between 3 to 5 Hz has been received, it is assumed that it is an ESS/RECAS pulse whereupon the following pulse is activated in a flashing mode. However, this solution involves a number of drawbacks. The major drawback is that when a first emergency feed pulse is received by the control device, it will be activated in a sequential mode. That is not allowed according to regulations. The emergency signal will not be clearly perceived as such by other drivers behind the vehicle until a next pulse is activated in a flashing mode, which may jeopardize the road traffic safety. Moreover, there is normally a certain delay from the time instance an emergency signal is requested in the vehicle's control system until an emergency feed pulse is received by a control device controlling the rear lamp. According to the regulations, the DI lamp must flash within 1 second after an emergency signal request. If the lamp only can detect a change in frequency, a sequential lit up could occur even after 1 second from an emergency signal request due to delays in the vehicle control system, which is not legally allowed.

Another drawback is that occasionally short pulses may be generated on the power supply line due to distortions or disturbances on the power supply line such as e.g. interference or transients. Such pulses could be interpreted as feed pulses and unintentionally change the mode of the DI lamp.

It is therefore an objective of the present invention to provide methods and a control system for controlling a rear lamp in a vehicle such that these drawback are fully or at least partly solved.

Figure 2:
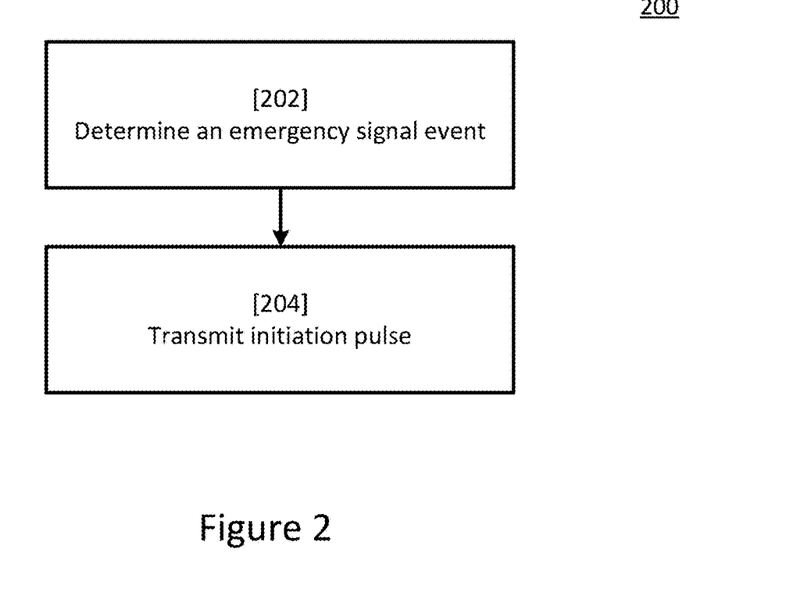
FIG. 2 shows a flow chart of a method according to embodiments of the invention.

Now turning to FIG. 2 showing a flowchart of a method 200 which may be executed in a control arrangement 160 of a vehicle 100.

The method 200 comprises determining 202 that an emergency signal event has occurred. The method 200 further comprises transmitting 204 one or more first initiation pulses $P_{I1}$, $P_{I2}$, ..., $P_{In}$ associated with the emergency signal event and subsequent emergency feed pulses $P_E$ on a power feed line 170 to a control device 180, wherein a duration $T_{I1}$, $T_{I2}$, ..., $T_{In}$ of each first initiation pulse $P_{I1}$, $P_{I2}$, ..., $P_{In}$ is shorter than a duration $T_E$ of an emergency feed pulse $P_E$.

The vehicle 100 may be equipped with a lightning system comprising a set of rear lamps 190 wherein the DI lamps are activated in sequential mode for DI signaling.

An emergency signal event may here relate to an event leading to an impending activation of an automatic emergency signal to alert following vehicles that an action may be needed to avoid a collision.

The one or more first initiation pulses $P_{I1}$, $P_{I2}$, ..., $P_{In}$ associated with the emergency signal event may here relate to an initial sequence of control pulses generated in the control arrangement and transmitted to the control device 180 controlling the rear lamp 190 of the vehicle 100 prior to the emergency feed pulses $P_E$ for activating the emergency signal. The initial sequence of pulses may comprise a predetermined number of first initiation pulses with a predetermined duration forming a unique and specific code pattern which will be recognized by the control device 180 and will prompt the control device 180 to activate the DI lamp of the rear lamp in a flashing mode.

Both the initial sequence $P_{I1}$, $P_{I2}$, ..., $P_{In}$ and the subsequent emergency feed pulses $P_E$ are transmitted on the existing power feed line 170 and thus no further communication interfaces need to be installed.

Figure 3:
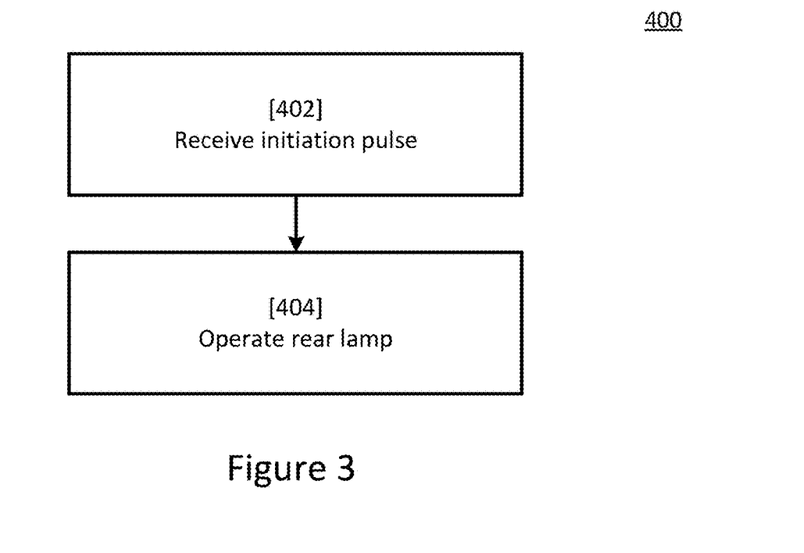
FIG. 3 illustrates an example of signaling sequence according to embodiments of the invention.

FIG. 3 shows a flow chart of a corresponding method 400 which may be executed in a control device 180 configured to operate a rear lamp 190 of a vehicle 100. The method 400 comprises receiving 402 one or more first initiation pulses $P_{I1}$, $P_{I2}$, ..., $P_{In}$ and subsequent emergency feed pulses, $P_E$, on a power feed line 170 from a control arrangement 160, wherein the one or more first initiation pulses $P_{I1}$, $P_{I2}$, ..., $P_{In}$ indicates to the control device 180 how the rear lamp 190 is to be operated, and wherein a duration $T_{I1}$, $T_{I2}$, ..., $T_{In}$ of each of the one or more first initiation pulses $P_{I1}$, $P_{I2}$, ..., $P_{In}$ is shorter than a duration, $T_E$, of an emergency feed pulse, $P_E$. The method further comprises operating 404 the rear lamp 190 in an emergency signal mode when receiving the one or more first initiation pulses $P_{I1}$, $P_{I2}$, ..., $P_{In}$.

When one or more first initiation pulses $P_{I1}$, $P_{I2}$, ..., $P_{In}$ on the power feed line is received by the control device 180, the control device 180 will recognize that the pattern of the received first initiation pulses corresponds to the unique code pattern of a first initiation sequence prompting the control device 180 to activate the DI lamp of the rear lamp in a flashing mode. The control device will thus control the rear lamp such that the subsequent feed pulses will be activated in emergency signal mode.

Emergency signal mode may here relate to simultaneous activation of lit elements L1, L2, ..., Ln of the DI lamp, which is also referred to as flashing mode. The control device is thus notified that emergency signal mode is to be applied prior to the reception of the feed pulses, which will result in fast and correct activation of the entire sequence of emergency feed pulses according to legal requirements. Hence, the risk of sequential activation of an emergency signal, which is prohibited by legal requirements, is eliminated and the traffic road safety increased.

Figure 4:
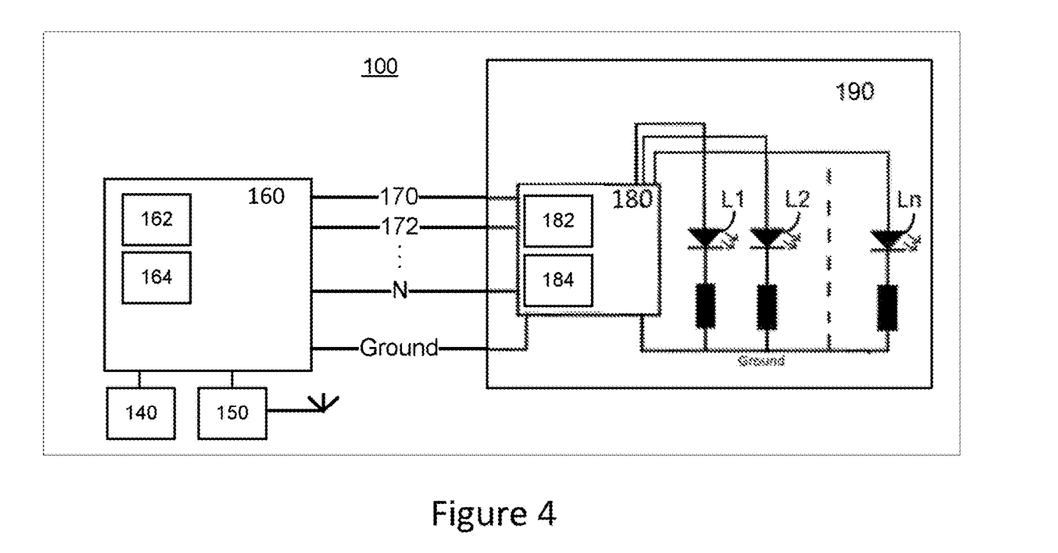
FIG. 4 illustrates a vehicle comprising a control system for controlling a rear lamp in the vehicle where the proposed invention may be implemented.

Now turning to FIG. 4, which will be used to explain and describe the previously presented method in a vehicle 100. In this respect FIG. 4 schematically illustrates a vehicle 100 comprising a control system for controlling a rear lamp 190. The vehicle 100 may comprise a means for transportation in broad sense such as e.g., a bus, a truck, or other similar manned or unmanned means.

The vehicle 100 comprises, in a conventional way, a plurality of electrical systems and subsystems. However, for simplicity only the parts of the vehicle 100 that are associated with the proposed method are shown in FIG. 4. Thus, the vehicle 100 comprises a control arrangement 160 for controlling a rear lamp 190 in the vehicle 100.

The control arrangement 160 may e.g. include a determining unit 162 and a transmitting unit 164 arranged for performing the method steps of the disclosed invention as is explained further. The control arrangement 120 will be described in further detail in FIG. 9.

The vehicle further comprises a rear lamp 190 which may be mounted near the left or right rear corner of the vehicle. Even though only one rear lamp 190 is shown in FIG. 4, it is to be understood that the vehicle comprises two rear lamps, each controlled according to the methods of the invention. Moreover, the control arrangement 160 may also be used to control rear lamps of a trailer or other unpowered vehicle towed by the vehicle 100. The rear lamp 190 comprises a control device 180 for controlling different lightning function of the lamp. The control device may e.g., comprise a microcontroller configured to receive a control pulse(s) such as an initiation pulse according to embodiments of the invention from the control arrangement 160 over the power feed lines 170, 172, . . . , N and based on the received pulse control and feed the rear lamp in the vehicle 100. For example, control pulse received over the DI power feed line 170, are used for controlling the lit elements L1, L2, . . . , Ln of the DI lamp. Thus, when a control pulse indicating activation of the DI lamp is received, the lit elements L1, L2, . . . , Ln of the DI lamp are activated during the duration of a subsequent feed pulse. The lit elements L1, L2, . . . , Ln may e.g., be activated by means of transistor switches (not illustrated) powering each lit element when a feed pulse is received. During a non-pulse duration, the lit elements of the DI lamp are deactivated. In similar fashion control signals received over the stop light feed line 172 are used for controlling the lit elements of the stop light (not illustrated). Other power feed lines may be used for operating other parts of the rear lamp 190.

The lit elements may, in conventional way comprise e.g., light-emitting diodes, LEDs, organic light-emitting diodes, OLEDs and/or incandescent light bulbs.

The control device 180 may e.g. include a receiving unit 182 and an operating unit 184, arranged for performing the method steps of the disclosed invention as will be explained further.

As previously explained, the control device 180 may control the lit elements L1, L2, . . . , Ln of the DI lamp in a sequential mode, where the lit elements L1, L2, . . . , Ln are activated sequentially, or in a flashing mode where the lit elements L1, L2, . . . , Ln of the DI lamp are activated simultaneously.

The rear lamp 190 may also, in a conventional way comprise filter electronics for over-voltage and short-circuit protection, DC/DC converter etc. Those components are not illustrated in FIG. 4.

The vehicle 100 may further include at least one sensor 140, e.g. a camera, a radar, a lidar and an accelerometer located at suitable positions within the vehicle 100. The vehicle may furthermore comprise sensors configured to measure a braking force/pressure applied on one or more of the vehicle's braking systems and sensor means for measuring the braking force/pressure applied on the vehicle's braking pedal.

The vehicle 100 may further include at least one communication device 150 arranged for communication with at least one entity external to the vehicle 100, such as e.g. an infrastructure entity, an external server, a positioning information entity and/or at least one communication entity of another vehicle.

According to various embodiments of the invention, the at least one communication device 150 may be a vehicle-to-vehicle, V2V, communication device, a vehicle-to-infrastructure, V2I, communication device, a vehicle-to-everything, V2X, communication device, and/or a wireless communication device such that communication between the vehicle 100 and the at least one external entity is achieved/provided.

In the following disclosure further embodiments of the invention will now be explained in more detail with reference to FIG. 5.

Figure 5:
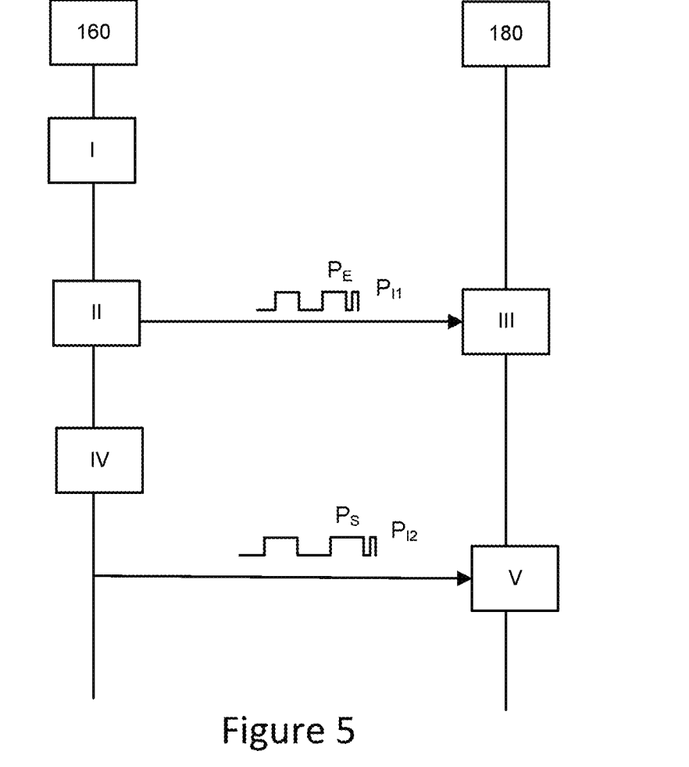
FIG. 5 shows a signaling diagram for an interaction between a control arrangement and a control device in a vehicle according to embodiments of the invention.

FIG. 5 shows a signaling diagram for the interaction between a control arrangement 160 and a control device 180 in a vehicle 100 according to such further embodiments of the invention.

In step I in FIG. 5, it is determined in the control arrangement 160 that an emergency signal event has occurred.

An emergency signal event may be detected according to a number of conventional methods. For example, an emergency signal event may occur during heavy/urgent braking of the vehicle when the speed of the vehicle exceeds a certain limit.

To detect heavy/urgent braking of the vehicle a negative acceleration of the vehicle may be determined e.g., by measuring, by means of e.g., one or more sensors, a force/pressure applied to each of the vehicle's brakes. A determined force/pressure exceeding threshold value in combination with a vehicle speed exceeding a threshold value may indicate emergency signal event. A heavy/urgent braking may be detected by measuring the retardation of the vehicle by means of e.g., an accelerometer where a negative acceleration of the vehicle of less than −4 m/s$^2$ in combination with a vehicle speed exceeding a threshold value may indicate emergency signal event. The braking power may furthermore be determined by measuring the force/pressure initiated by the driver and applied on the braking pedal of the vehicle, where a braking power larger than a predetermined threshold in combination with a vehicle speed exceeding a threshold value may indicate an emergency signal event.

An emergency signal event may furthermore be detected based on information related to prevailing road conditions. For example, such information may, e.g., comprise information related to a detected obstacle in front of the vehicle where it is determined that heavy/urgent braking must be applied in the vehicle to avoid a collision with the detected obstacle. An obstacle may be detected by means of one or more sensor means 140 onboard the vehicle 100, e.g., a camera, a radar, a lidar or a combination of those. An obstacle may furthermore be detected based on information obtained from external sources. Such information may be received in communication from at least one other vehicle or from at least one infrastructure device by means of applicable communication means like V2V communication, V2I communication, V2X communication, or similar. A required braking force to avoid a collision with the detected object may be determined according to conventional methods based on road conditions, speed, vehicle's weight etc.

In an embodiment, the emergency signal event may be an ESS, i.e., a signal indicating that a high retardation force has been applied to the vehicle relative to the prevailing road conditions. In another embodiment, the emergency signal event may be a RECAS, i.e., a signal warning that the following vehicle needs to take emergency action to avoid collision.

It should be understood that the herein disclosed method is not limited to the above-mentioned examples but may be executed also in other cases when switching between a sequential DI lamp activation and emergency/flashing mode is required or desired. Further examples of situations when it might be desirable to switch between the default sequential mode and the emergency/flashing mode may e.g., be activation of hazard warning signal or activation of a burglar alarm signal.

In step II in FIG. 5, the control arrangement 160 performs transmission of a pulse sequence comprising one or more first initiation pulses $P_{I1 1}, P_{I1 2}, \ldots, P_{I1 n}$ associated with the emergency signal event and subsequent emergency feed pulses $P_E$ on a power feed line 170 to the control device 180.

Figure 6:
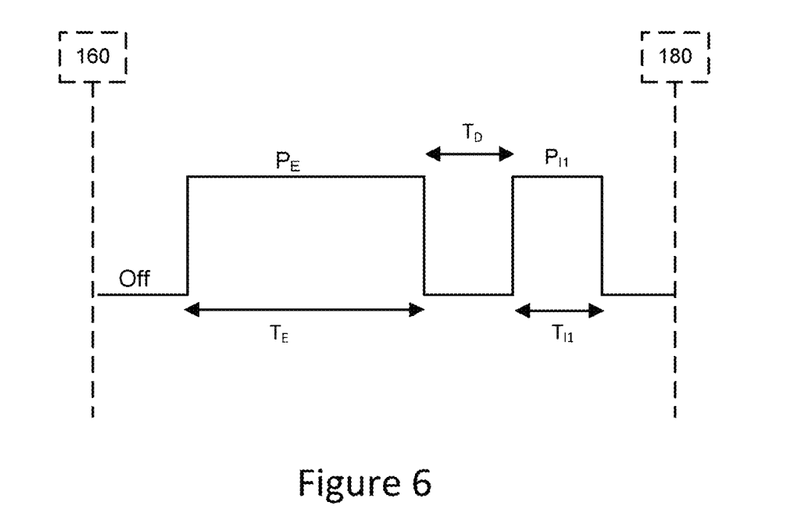
FIG. 6 illustrates a non-limiting example of a pulse sequence according to embodiments of the invention.

FIG. 6 illustrates a non-limiting example of a pulse sequence according to embodiments of the invention. The pulse sequence may here correspond to the pulse sequence transmitted from the control arrangement 160 to the control device 180 in step II in FIG. 5. The pulse sequence according to the example in FIG. 6 comprises one first initiation pulse $P_{I1}$ with a duration $T_{I1}$. The first initiation pulse is followed by a non-pulse period with a duration $T_D$ and an emergency feed pulse $P_E$ with a duration $T_E$. During the emergency feed pulse $P_E$ the DI lamp is to be activated in an emergency signal mode, i.e., in flashing mode. During the subsequent non-pulse period the DI lamp is deactivated.

The first initiation pulse and the subsequent non-pulse period form here a predetermined first initiation sequence which, when received by the control device 180 will be recognized as a first initiation sequence prompting the control device 180 to activate the subsequent feed pulses $P_E$ in emergency signal mode. Although the first initiation sequence in the example in FIG. 6 comprises one first initiation pulse $P_{I1}$, it should be understood that the first initiation sequence may comprise one or more first initiation pulses $P_{I11}, P_{I12}, \ldots, P_{I1n}$ forming a predetermined code pattern.

According to embodiments of the invention, the duration $T_{I11}, T_{I12}, \ldots, T_{I1n}$ of each first initiation pulse $P_{I11}, P_{I12}, \ldots, P_{I1n}$ may be shorter than a duration $T_E$ of an emergency feed pulse $P_E$. In an embodiment the duration $T_{I11}, T_{I12}, \ldots, T_{I1n}$ of the each one of the one or more first initiation pulses $P_{I11}, P_{I12}, \ldots, P_{I1n}$ may be less than 80% of the duration $T_E$ of the emergency feed pulse $P_E$. Due to that, the control device 180 may easily recognize the first initiation pulse $P_{I11}, P_{I12}, \ldots, P_{I1n}$ as being part of the first initial sequence and distinguish them from an emergency feed pulse sequence or a sequence of other feed pulses.

As previously explained the duration $T_E$ of an emergency feed pulse $P_E$ may be between 167 ms and 100 ms. In a non-limiting example, the duration of a first initiation pulse may be between 5 ms and 95 ms.

The first initiation sequence may here be configured with respect to the number and duration of the first initiation pulses $P_{I11}, P_{I12}, \ldots, P_{I1n}$ as well as the duration of the non-pulse periods $T_{D1}, T_{D2}, \ldots, T_{Dn}$ to form a unique, predetermined code pattern prompting the control device 180 to actuate the emergency signal mode when activating the DI lamp for the subsequent feed pulses. Such configuration may e.g. be done by the manufacturer of the vehicle considering characteristics requirements put on the rear lamp 190 control. Often a trade-off may be needed with respect to delay and reliability requirements. For example, a short first initial sequence comprising one first initiation pulse may result in a fast control of the rear lamp 190 and entail fast activation of the emergency signal mode. On the other side, the risk of mistakenly interpret disturbances on the power line as an initiation sequence may increase which may lead to decreased reliability of the rear lamp control due to unintentional mode change in the DI lamp 190. In one example, a first initiation pulse may be longer that a threshold value. A quality of a pulse will increase when pulse duration increases. Moreover, the duration of a pulse may be longer than duration of an interference signal in order to achieve a reliable mode switching method. An initial sequence comprising several first initiation pulses may increase the control reliability, but the total duration of the sequence may increase which may lead to longer response times.

These and more considerations need to be taken into account when configuring the first initial sequence.

The duration of the one or more first initiation pulses $P_{I11}, P_{I12}, \ldots, P_{I1n}$ are not limited to be equal. In an embodiment the one or more first initiation pulses $P_{I11}, P_{I12}, \ldots, P_{I1n}$ may have equal duration. In an embodiment, at least one of the one or more first initiation pulses $P_{I11}, P_{I12}, \ldots, P_{I1n}$ may have a different duration $T_{I11}, T_{I12}, \ldots, T_{I1n}$. This provides a versatile method of configuring unique control sequences for different purposes which may easily be distinguished from each other and provide different control means for the rear lamp 190 of the vehicle 100.

In step III in FIG. 5, the control device 180 receives an initiation sequence comprising one or more first initiation pulses $P_{I11}, P_{I12}, \ldots, P_{I1n}$ and subsequent emergency feed pulses $P_E$ on a power feed line 170. If the initial sequence is recognized as the first initiation sequence associated with the emergency signal event, the control device 180 operates the rear lamp 190 in an emergency signal mode when the DI lamp is activated based on the subsequent emergency feed pulses $P_E$.

Optionally, in embodiments the control device may detect a stop light activation signal $P_{Stop}$ for the rear lamp 190 and operate the rear lamp 190 in the emergency signal mode when the duration $T_{I11}, T_{I12}, \ldots, T_{I1n}$ of each one of the one or more first initiation pulses $P_{I11}, P_{I12}, \ldots, P_{I1n}$ is shorter than the duration $T_E$ of the emergency feed pulse $P_E$ and when the stop light activation signal $P_{Stop}$ for the rear lamp 190 has been detected.

Figure 7:
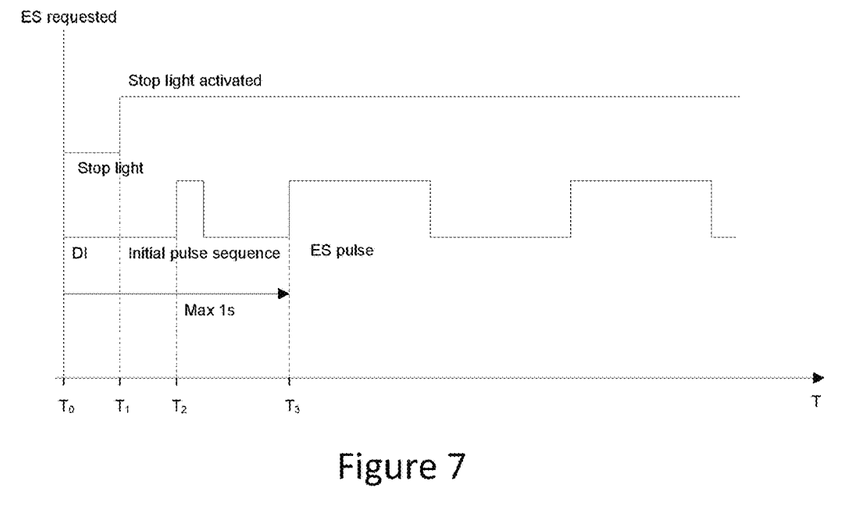
FIG. 7 shows a non-limiting example of control signaling when an emergency signal has been requested according to embodiments of the invention.

FIG. 7 shows a non-limiting example of control signaling over the power feed lines 170, 172, ..., N according to the invention when an emergency signal has been requested. Here, the control signalling is shown as a function of time T.

At time instance $T_0$, an emergency signal event has been determined and emergency signals are requested. As previously explained an emergency signal event may involve heavy/urgent braking. An emergency signal may thus comprise an automatic activation of the stop lights and an emergency signal on the DI lamp of the vehicle's rear lamp. As previously explained, the entire emergency signal must be activated in an emergency signal mode within 1 s of emergency signal request.

At time instance $T_1$, the stop light is activated. The stop light may be activated when the control device 180 receives a stop light activation signal $P_{Stop}$ over the stop light feed line 172 from the control arrangement 160.

At time instance $T_2$, the control device 180 receives a pulse sequence over the DI power feed line 170. The pulse sequence is determined to be the predetermined first initial pulse sequence.

At time instance $T_3$, the control device 180 receives emergency feed pulses and applies an emergency signal mode when activating the emergency signal on the DI lamp of the vehicle if a predetermined criteria has been fulfilled. In one example, the predetermined criteria may be the reception of the predetermined first initial pulse sequence at time instance $T_2$. In another example, the predetermined criteria may be the reception of the predetermined first initial pulse sequence combined with the fact that the stop lights of the vehicle are activated. The additional control that the stop lights are activated may further increase the reliability of the rear lamp control method. For example, if the pulse sequence received at time instance $T_2$ is not a first initial pulse sequence, but has mistakenly been interpreted as such, the emergency signal mode will not be activated.

In step IV in FIG. 5, in an embodiment, it is determined by the control arrangement 160 that the emergency signal event has terminated. Thus the transmitting of emergency feed pulses $P_E$ is terminated.

The control arrangement 160 performs transmission of one or more second initiation pulses $P_{I11}, P_{I12}, \ldots, P_{I1n}$ associated with a sequential signal mode and subsequent sequential feed pulses $P_S$ on the power feed line 170 to the control device 180, wherein a duration $T_{I21}, T_{I22}, \ldots, T_{I2n}$ of each one of the one or more second initiation pulses $P_{I11}, P_{I12}, \ldots, P_{I1n}$ is shorter than a duration Ts of a sequential feed pulse $P_s$. The one or more second initiation pulses $P_{I11}, P_{I12}, \ldots, P_{I1n}$ with a sequential signal mode may here relate to a second initial sequence of control pulses generated in the control arrangement when the emergency signal event has terminated and when a DI signal is requested. The second initial sequence of pulses may, in similar way as the first initial sequence, comprise a predetermined number of second initiation pulses with a predetermined duration forming a specific code pattern which will be recognized by the control device 180 and will prompt the control device 180 to activate the DI lamp of the rear lamp in a sequential mode.

In step V in FIG. 5, in an embodiment, the control device 190 receives one or more second initiation pulses $P_{I11}, P_{I12}, \ldots, P_{I1n}$ associated with a sequential signal mode and subsequent sequential feed pulses $P_s$ on the power feed line 170 from the control arrangement 160, wherein a duration $T_{I21}, T_{I22}, \ldots, T_{I2n}$ of each of the one or more second initiation pulses $P_{I11}, P_{I12}, \ldots, P_{I1n}$ is shorter than a duration Ts of a sequential feed pulse $P_s$ and operates the rear lamp 190 in the sequential signal mode when receiving the one or more second initiation pulses $P_{I11}, P_{I12}, \ldots, P_{I1n}$.

Optionally, in an embodiment, the control device 190 may operate the rear lamp 190 to switch from the emergency signal mode to a sequential signal mode when a non-pulse time period on the power feed line 170 is larger than a threshold value. In one example, the threshold value may be larger than the duration of a non-pulse period of an emergency feed pulse. Thus, when a non-pulse period is larger than a predetermined time the control device 180 may determine that the emergency signal has terminated, and the operation of the DI lamp may return to the default sequential mode.

Figure 8:
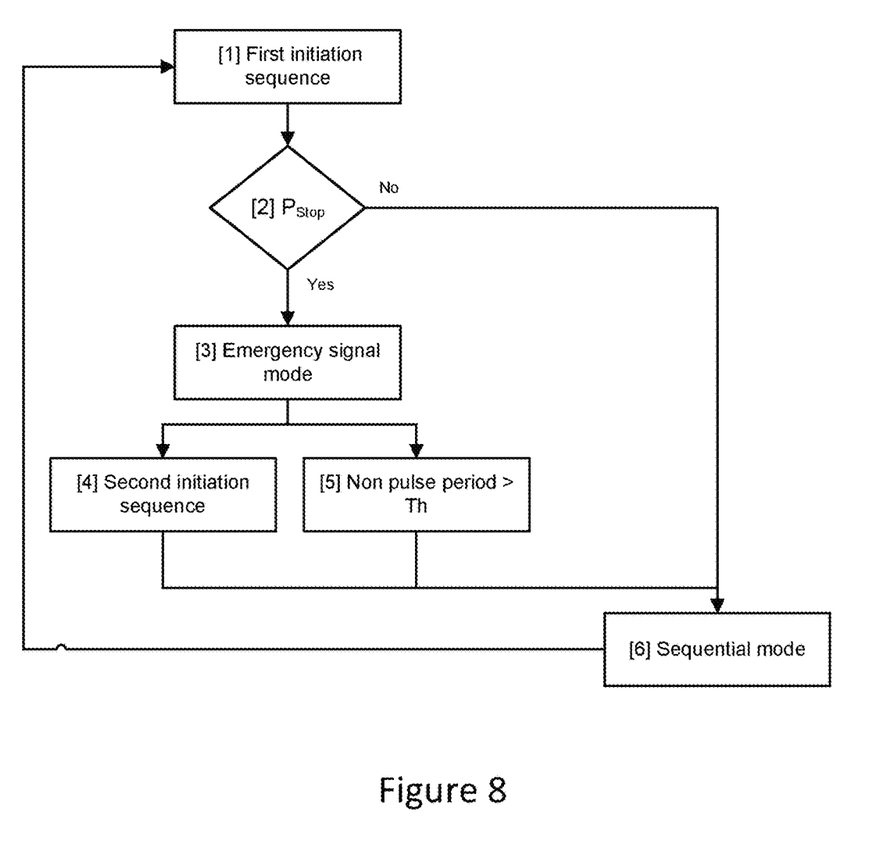
FIG. 8 illustrated a non-limiting example of a control logic in a control device of a vehicle according to embodiments of the invention.

To further illustrate some embodiments of the invention, a non-limiting example of logic in control device 180 configured to operate a rear lamp 190 of a vehicle 100 according to embodiments of the invention is illustrated in FIG. 8.

In step 1 in FIG. 8, the control device 180 receives a first initiation sequence over a DI power feed line 170. The first initiation sequence is followed by a sequence of emergency feed pulses $P_E$.

In step 2 in FIG. 8, the control device 180 determines if the stop light of the rear lamp is activated or not. If the stop light of the rear lamp is not activated (No), the control device 180 in step 6 operates the DI lamp in sequential mode. If the stop light of the rear lamp is activated (Yes), the logic continues to step 3.

In step 3, the control device 180 operates the DI lamp such that the sequence of emergency feed pulses $P_E$ is activated in an emergency signal mode.

In step 4, the control device 180 receives a second initiation sequence over a DI power feed line 170 followed by a sequence of sequential feed pulses $P_s$, whereafter the logic continues to step 6.

Alternatively, in step 5, the control device 180 determines that the emergency signal event has terminated when a non-pulse period on the power feed line 170 is larger than a threshold value, e.g., larger than a non-pulse period duration of an emergency feed pulse, whereafter the logic continues to step 6.

In step 6, the control device 180 operates the DI lamp such that the sequence of sequential feed pulses $P_S$ is activated in a sequential signal mode. The sequential signal mode may be terminated by returning to step 1, i.e., when the control device receives a first initiation sequence over a DI power feed line 170.

According to an aspect of the invention, a control arrangement 160 for controlling a vehicle 100 is presented. The control arrangement 160 includes means 162 arranged for determining 202 that an emergency signal event has occurred.

The control arrangement 160 further includes means 164 arranged for transmitting 204 one or more first initiation pulses $P_{I11}, P_{I12}, \ldots, P_{I1n}$ associated with the emergency signal event and subsequent emergency feed pulses $P_E$ on a power feed line 170 to a control device 180, wherein a duration $T_{I11}, T_{I12}, \ldots, T_{I1n}$ of each first initiation pulse $P_{I11}, P_{I12}, \ldots, P_{I1n}$ is shorter than a duration $T_E$ of an emergency feed pulse $P_E$.

According to a further aspect of the invention, a control device 180 configured to operate a rear lamp 190 of a vehicle 100 is presented. The control device 180 includes means 182 arranged for receiving 402 one or more first initiation pulses $P_{I11}, P_{I12}, \ldots,$ Pain and subsequent emergency feed pulses $P_E$ on a power feed line 170 from a control arrangement 160, wherein the one or more first initiation pulses $P_{I11}, P_{I12}, \ldots, P_{I1n}$ indicates to the control device 180 how the rear lamp 190 is to be operated, and wherein a duration $T_{I11}, T_{I12}, \ldots T_{I1n}$ of each of the one or more first initiation pulses $P_{I11}, P_{I12}, \ldots, P_{I1n}$ is shorter than a duration $T_E$ of an emergency feed pulse $P_E$.

The control device 180 further includes means 184 arranged for operating 404 the rear lamp 190 in an emergency signal mode when receiving the one or more first initiation pulses $P_{I11}, P_{I12}, \ldots, P_{I1n}$.

The control arrangement 160 and the control device 180, e.g. a device or a control device, according to the invention may be arranged for performing all methods according to embodiments of the invention. The control arrangement 160 and the control device 180 are hereby provided with the above-described advantages for each respective embodiment.

The invention is also related to a rear lamp 190 for a vehicle comprising the control device 180.

Furthermore, the invention is also related to a vehicle 100 comprising the control arrangement 160 and/or the control device 180 and/or the rear lamp 190.

Figure 9:
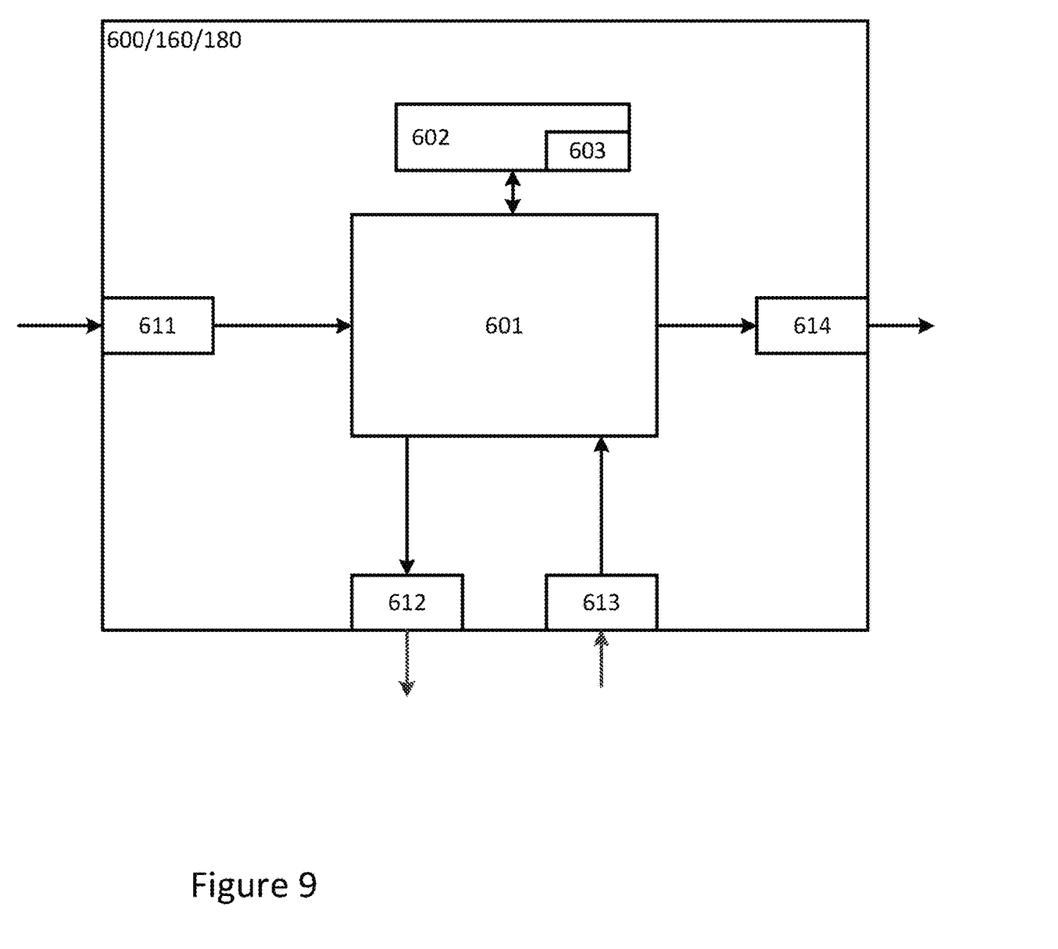
FIG. 9 illustrates a control arrangement and a control device of a vehicle according to embodiments of the invention.

Now turning to FIG. 9 which illustrates the control arrangement 600 which may correspond to the control arrangement 160 or the control device 180. The control arrangement 600 may include one or more of the above-mentioned control units 162 and 164 or 182 and 184 i.e. the control units performing the method steps of the disclosed invention. The control arrangement 600 comprises a computing unit 601, which can be constituted by essentially any suitable type of processor or microcomputer, e.g. a circuit for digital signal processing such as Digital Signal Processor, DSP, or a circuit having a predetermined specific function such as Application Specific Integrated Circuit, ASIC. The computing unit 601 is connected to a memory unit 602 arranged in the control arrangement 600, which memory unit provides the computing unit 601 with, e.g., the stored program code and/or the stored data which the computing unit 601 requires to be able to perform computations. The computing unit 601 is also arranged to store partial or final results of computations in the memory unit 602.

In addition, the control arrangement 600 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing unit 601 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network, CAN, bus, a Media Orientated Systems Transport, MOST, bus, or some other bus configuration; or by a wireless connection. A person skilled in the art will appreciate that the above-stated computer can be constituted by the computing unit 601 and that the above-stated memory can be constituted by the memory unit 602.

Control systems in modern vehicles commonly comprise communication bus systems consisting of one or more communication buses for linking a number of electronic control units, ECUs, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 4 and 9, which is well known to the person skilled in the art within this technical field.

In a shown embodiment, the invention may be implemented by the one or more above mentioned control units 162 and 164 or 182 and 184. The invention can also, however, be implemented wholly or partially in one or more other control units already in the vehicle 100, or in some control unit dedicated to the invention.

Here and in this document, units are often described as being arranged for performing steps of the method according to the invention. This also includes that the units are designed to and/or configured to perform these method steps.

The one or more control units are in FIG. 4 illustrated as separate units. These units may, however, be logically separated but physically implemented in the same unit or can be both logically and physically arranged together. These units may e.g. correspond to groups of instructions, which can be in the form of programming code, that are input into, and are utilized by a processor/computing unit 601 when the units are active and/or are utilized for performing its method step, respectively.

The person skilled in the art will appreciate that a the herein described embodiments may also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. The computer-readable medium comprises a suitable memory, such as, e.g.: Read-Only Memory, ROM, Programmable Read-Only Memory, PROM, Erasable Programmable Read-Only Memory, EPROM, Flash memory, Electrically Erasable Programmable Read-Only Memory, EEPROM, a hard disk unit, etc.

The invention is not limited to the above-described embodiments. Instead, the invention relates to, and encompasses all different embodiments being included within the scope of the independent claims.

The invention claimed is:

1. A method performed by a control arrangement of a vehicle, the method comprising:
   determining that an emergency signal event has occurred; and
   transmitting one or more first initiation pulses associated with the emergency signal event and subsequent emergency feed pulses on a power feed line to a control device, wherein a duration of each first initiation pulse is shorter than a duration of an emergency feed pulse.

2. The method according to claim 1, wherein the duration of the each one of the one or more first initiation pulses is less than 80% of a duration of the emergency feed pulse.

3. The method according to claim 1, wherein either:
   the one or more first initiation pulses have equal duration; or
   at least one of the one or more first initiation pulses has a different duration.

4. The method according to claim 1, further comprising:
   determining that the emergency signal event has terminated; and
   transmitting one or more second initiation pulses associated with a sequential signal mode and subsequent sequential feed pulses on the power feed line to the control device, wherein a duration of each one of the one or more second initiation pulses is shorter than a duration of a sequential feed pulse.

5. The method according to claim 1, wherein the emergency signal event is either an emergency stop signal event or a rear-end collision stop signal event.

6. A method performed by a control device configured to operate a rear lamp of a vehicle, the method comprising:
   receiving one or more first initiation pulses and subsequent emergency feed pulses on a power feed line from a control arrangement, wherein the one or more first initiation pulses indicate to the control device how the rear lamp is to be operated, and wherein a duration of each of the one or more first initiation pulses is shorter than a duration of an emergency feed pulse; and
   operating the rear lamp in an emergency signal mode when receiving the one or more first initiation pulses.

7. The method according to claim 6, wherein the duration of each one of the one or more first initiation pulses is less than 80% of a duration of the emergency feed pulse.

8. The method according to claim 6, wherein:
   the one or more first initiation pulses have equal duration; or
   at least one of the one or more first initiation pulses has a different duration.

9. The method according to claim 6, further comprising detecting a stop light activation signal for the rear lamp; and
   operating the rear lamp in the emergency signal mode when the duration of each one of the one or more first initiation pulses is shorter than the duration of the emergency feed pulse and when the stop light activation signal for the rear lamp has been detected.

10. The method according to claim 6, further comprising
receiving one or more second initiation pulses associated with a sequential signal mode and subsequent sequential feed pulses on the power feed line from the control arrangement, wherein a duration of each of the one or more second initiation pulses is shorter than a duration of a sequential feed pulse; and
operating the rear lamp in the sequential signal mode when receiving the one or more second initiation pulses.

11. The method according to claim 6, further comprising operating the rear lamp to switch from the emergency signal mode to a sequential signal mode when a non-pulse time period on the power feed line is larger than a threshold value.

12. The method according to claim 6, wherein the emergency signal mode is an emergency stop signal mode or a rear-end collision stop signal mode.

13. A control arrangement for controlling a vehicle, the control arrangement being configured to:
determine that an emergency signal event has occurred; and
transmit one or more first initiation pulses associated with the emergency signal event and subsequent emergency feed pulses on a power feed line to a control device, wherein a duration of each first initiation pulse is shorter than a duration of an emergency feed pulse.

14. A control device configured to operate a rear lamp of a vehicle, the control device being configured to:
receive one or more first initiation pulses and subsequent emergency feed pulses on a power feed line from a control arrangement, wherein the one or more first initiation pulses indicate to the control device how the rear lamp is to be operated, and wherein a duration of each of the one or more first initiation pulses is shorter than a duration of an emergency feed pulse; and
operate the rear lamp in an emergency signal mode when receiving the one or more first initiation pulses.

15. A rear lamp for a vehicle comprising a control device configured to operate a rear lamp of a vehicle, the control device being configured to:
receive one or more first initiation pulses and subsequent emergency feed pulses on a power feed line from a control arrangement, wherein the one or more first initiation pulses indicate to the control device how the rear lamp is to be operated, and wherein a duration of each of the one or more first initiation pulses is shorter than a duration of an emergency feed pulse; and
operate the rear lamp in an emergency signal mode when receiving the one or more first initiation pulses.

16. A vehicle comprising:
a control arrangement configured to:
determine that an emergency signal event has occurred; and
transmit one or more first initiation pulses associated with the emergency signal event and subsequent emergency feed pulses on a power feed line to a control device, wherein a duration of each first initiation pulse is shorter than a duration of an emergency feed pulse; and/or
a control device configured to operate a rear lamp of a vehicle, the control device being configured to:
receive one or more first initiation pulses and subsequent emergency feed pulses on a power feed line from a control arrangement, wherein the one or more first initiation pulses indicate to the control device how the rear lamp is to be operated, and wherein a duration of each of the one or more first initiation pulses is shorter than a duration of an emergency feed pulse; and
operate the rear lamp in an emergency signal mode when receiving the one or more first initiation pulses.

17. A computer program product comprising computer program code stored on a non-transitory computer-readable medium, said computer program product used as a controll arrangement of a vehicle, said computer program code comprising computer instructions to cause one or more computers to perform the following operations:
determining that an emergency signal event has occurred; and
transmitting one or more first initiation pulses associated with the emergency signal event and subsequent emergency feed pulses on a power feed line to a control device, wherein a duration of each first initiation pulse is shorter than a duration of an emergency feed pulse.

* * * * *